United States Patent
Hedler et al.

[15] 3,657,009
[45] Apr. 18, 1972

[54] PROCESS FOR ALUMINIZING THE SCREEN OF A CATHODE RAY TUBE

[72] Inventors: Robert A. Hedler; Malcolm E. Magill, both of Seneca Falls, N.Y.

[73] Assignee: Sylvania Electric Products Inc.

[22] Filed: Apr. 12, 1968

[21] Appl. No.: 721,077

Related U.S. Application Data

[63] Continuation-in-part of Ser. No. 422,558, Nov. 31, 1964, abandoned.

[52] U.S. Cl. .................................117/33.5 CM, 117/35 V
[51] Int. Cl. ..........................................................H01j 31/20
[58] Field of Search ..........................117/35 V, 33.5; 96/36.1

[56] References Cited

UNITED STATES PATENTS 2,642,365  6/1953  De Gier et al........................117/35 V Primary Examiner—Alfred L. Leavitt
Assistant Examiner—Wayne F. Cyron
Attorney—Norman J. O'Malley, Cyril A. Krenzer and Frederick H. Rinn

[57] ABSTRACT

An improved process for aluminizing the screen of a cathode ray tube wherein rapid and uniform dampening of the applied phosphor screen is accomplished prior to lacquering by rinsing with an aqueous solution of an organic solvent wherein the solvent content ranges substantially from one to twenty percent by volume. The solvent is at least one selected alcohol or ketone being a 1, 2, 3, 4 or 5 carbon chain compound having one functional radical group with a melting point below −11° centigrade and a molecular weight ranging between 32.0 and 89.0. After rinsing, a lacquer film is applied over the screen upon which a thin aluminum film is disposed. Subsequent baking removes the lacquer material from the screen.

3 Claims, No Drawings

PROCESS FOR ALUMINIZING THE SCREEN OF A CATHODE RAY TUBE

This application is a continuation-in-part of application Ser. No. 422,558, filed Dec. 31, 1964, now abandoned.

BACKGROUND OF THE INVENTION

This invention relates to the manufacturing of cathode ray tubes and more particularly to a method for achieving improved aluminizing of the phosphor screen thereof.

It is a conventional practice in the manufacture of a color television cathode ray tube, as it has been in the monochrome phase of the industry, to apply a thin aluminized coating to the back of the phosphor screen that is normally away from the viewer. This produces a mirror finish that reflects, out toward the viewer, light from the screen which would otherwise be lost within the tube. Thus, tubes so treated have improved brightness, enhanced picture contrast, and an overall resultant improvement in screen display presentation that is not evidenced in non-aluminized tubes.

In color picture tube manufacturing it is conventional to apply the multi-phosphor screen to the inner surface of the face panel, and sequentially process the same, before hermetically joining the panel to the funnel or envelope portion of the tube. The plural phosphors, per se, are suitably disposed as multitudinous dots or discrete stripes in accordance with the several established procedures well known to the art. The application of the desired aluminized mirror film on the back surface of the multi-phosphor screen is a delicate procedure. The first step involves wetting or water dampening the phosphor screen and allowing a set time to promote complete dampening coverage of the screen. Next a thin film of lacquer is applied over the back of the dampened screen to provide a surface upon which to form the mirror. A thin layer of aluminum coating is laid over the lacquer film, and finally the lacquer is removed by baking whereupon the smooth reflective aluminum coating remains supported directly by the phosphor screen. It is essential to utilize the lacquer as an intermediate processing support since the aluminum applied directly over the surface of the phosphor would tend to penetrate and poison the crystals, thereby reducing or destroying their desired luminescent qualities.

Naturally, from the standpoint of efficient manufacturing, it is desired to produce a large number of high quality aluminized screens within a reasonable span of time. Unfortunately certain processing time elements and various manufacturing imperfections occur during the aluminizing procedure which hinder desired production achievement. The initial screen wetting step at the beginning of the aluminizing process requires a set time, in the neighborhood of three or more minutes, which aggravates the establishment of an efficient manufacturing pace for the several steps subsequent thereto. In addition, uneven or insufficient wetting produces faulty lacquer films, i.e., lacquer films which contain holes, tears, swirls, blisters or other defects. Such lacquering flaws necessitate the complete and careful removal of the lacquer film to facilitate a repeat of the lacquering procedure which is not only inefficient but also time consuming. Furthermore, if the inferior lacquering escapes inspection, the finished aluminum coating will be faulty and the whole of the aluminized screen unacceptable.

OBJECTS AND SUMMARY OF THE INVENTION

It is an object of the invention to reduce the aforementioned disadvantages and to provide an improved aluminizing process for cathode ray tube screens.

Another object is to produce an unblemished lacquer film, a prerequisite to satisfactory aluminizing, by insuring prior uniform dampening of the phosphor screen.

A further object is to improve the quality of the aluminized tube product and to provide improved efficiency in tube production.

The foregoing objects are achieved in one aspect of the invention by the provision of an improved screen aluminizing process wherein uniform dampening of the phosphor screen, prior to lacquering, is expeditiously accomplished by rinsing the previously applied screen with an aqueous solution ranging substantially from one percent to twenty percent by volume, of a water soluble organic solvent selected from the group consisting of 1, 2, 3, 4, and 5 carbon chain compounds each having one functional radical group therein and melting points below $-11°$ C with molecular weights ranging between 32.0 to 89.0 of which one example is 2-propanol. After rinsing the screen with this organic solution, a volatile lacquer film is applied to the screen and the thin aluminized coating laid thereover. Subsequently the lacquer film is removed by a baking procedure.

DESCRIPTION OF THE PREFERRED EMBODIMENT

For a better understanding of the present invention, together with other and further objects, advantages, and capabilities thereof, reference is made to the following specification and appended claims.

As was indicated previously, in order to form a reflective surface of aluminum to be utilized in the color cathode ray tube, it is necessary to deposit a suitable surface over the back of the multi-phosphor screen upon which the aluminum film is deposited. The lacquer cannot be applied directly to a dry phosphor screen as the lacquer will diffuse into or penetrate the screen and the subsequent aluminum film disposed thereover will do likewise thereby diminishing the luminescent efficiency of the phosphors in the screen. Therefore a barrier layer or thin film of water is applied as a water rinse over the previously disposed phosphor screen. While, in this instance, the wetting phenomenon is not completely understood, it is thought to be as follows: the disposed screen, being composed of crystalline structures, has a somewhat roughened surface. The membrane of water, because of its surface tension, tends to bridge the interstices between crystals. In certain instances, the crystals are so oriented that the interstitial spaces therebetween have deeper clefts. The application of the lacquer film to the high-bridging water membrane breaks through the surface tension of the water and allows the lacquer to flow therebeneath and penetrate the crystalline structure of the screen. It has been found that this can be prevented by adding to the water rinse a quantity of a selected water soluble organic solvent in the form of certain alcohols and ketones. The specific organic solvents have a functional group in the form of a hydroxyl or carbonyl group incorporated in an organic molecule, and when added to water the resultant solution has a lower surface tension than that of water and exerts less bridging between crystals. Thus, the aqueous solution provides for the rapid formation of a screen-dampening film that contiguously follows the rough contour of the phosphor screen with no air-filled voids therebeneath. Thus, uniform dampening of the entire screen is effected. When the lacquer material is applied, the underlying aqueous-organic dampening film, being contiguous upon the topography of the screen, forms a continuous barrier to prevent lacquer penetration and results in the deposition of a uniform lacquer base upon which the reflective aluminum coating is formed.

The volatile lacquer solution, which is applied to the dampened screen may comprise a nominal 4.0 to 6.0 percent (weight per volume) solution of resins solids, such as isobutyl methacrylate and an acrylic resin polymer film former, in a colorless hydrocarbon solvent such as toluene or xylene. A plasticizer as, for example, dibutyl phthalate is added to control the lacquer film shrinkage. The various amounts of the different ingredients called for are known in the art and need not be expanded upon here.

It has been found that the aqueous-organic rinse solutions having a volumetric organic solvent content in excess of 20 percent have resulted in lower quality lacquering results. This is thought to be due to the dissolving of some of the lacquer film in the high solvent content rinse. It is to be noted that, while the lacquer material contains none of the specific organic solvents concerned, the lacquer is soluble therein. Therefore, it has been found that, for best results, the organic solvent content of the rinse should not be greater than 20 percent by volume.

In greater detail, the multi-phosphor screen disposed on the color tube face panel is rinsed with an aqueous solution having a total volumetric organic solvent content ranging substantially from one percent to twenty percent of one or more of certain water soluble organic solvents selected from the group of 1, 2, 3, 4, and 5 carbon chain monohydric alcohols and ketones that have melting points below −11° C and molecular weights ranging from 32.0 to 89.0. More specifically this includes specific monohydric alcohols, namely, methanol, ethanol, 1-propanol, 2-propanol, 2-methyl-1-propanol, 1-butanol, 2-butanol, 3-methyl-1-butanol, 2-methyl-2-butanol, 1-pentanol, and 2-pentanol; and specific ketones in the form of 2-propanone, 2-butanone, and 2-pentanone.

In general, the 5 carbon chain solvent compounds are less soluble in water than the lower carbon chain compounds. Therefore, for one embodiment of the invention a workable combination has been found in which an aqueous solution having a total volumetric organic solvent content ranging substantially from one percent to twenty percent has a minimum of 90 percent thereof in the form of one or more of the alcohols and ketones selected from the 1, 2, 3, and 4 carbon chain compounds having melting points below −85° C and molecular weights ranging from 32.0 to 75.0. Those organic solvents constituting this group are: methanol, ethanol, 1-propanol, 2-propanol, 2-methyl-1-propanol, 1-butanol, 2-butanol, 2-propanone, and 2-butanone. In addition to the above, a maximum of 10 percent of the alcohol content may be in the form of one or more of the alcohols and ketones selected from the 5 carbon chain solvent compounds having melting points below −11° C and molecular weights ranging between 86.0 and 89.0. Examples of this group are: 3-methyl-1-butanol, 2-methyl-2-butanol, 1-pentanol, 2-pentanol, and 2-pentanone.

An adequate embodiment of the invention is an aqueous-organic solution having a total volumetric organic solvent content ranging substantially from one percent to twenty percent of one or more of the solvents selected from the 3 and 4 carbon chain compounds containing one functional radical group with melting points below −85° C and molecular weights within the range of 58.0 to 75.0. Solvents constituting this group are 1-propanol, 2-propanol, 2-methyl-1-propanol, 1-butanol, 2-butanol, 2-propanone, and 2-butanone.

Use of the aqueous-organic solvent rinse has resulted in uniform and consistent screen dampening whereby the set time prior to lacquering has been reduced from minutes to seconds and a minimum of defects encountered.

Normally, the alcohols and ketones used have been anhydrous ACS Grades (American Chemical Society), but Technical Grades have been found adequate.

After rinsing the phosphor screen with the aqueous-organic solution, the panel is drained and the lacquer film applied by spray or slurry. After drying, excess lacquer is removed from the edges of the face panel beyond the area of the screen. Aluminizing of the lacquered screen is accomplished by conventional vaporous deposition in a vacuum environment. The panel is then baked to remove the volatile lacquer film leaving the reflective aluminum backing on the phosphor screen.

Thus, an improved aluminizing process for cathode ray tube screens has been achieved. The uniform dampening of the phosphor screen has resulted in the deposition of an unblemished lacquer film which is a prerequisite to satisfactory aluminizing. In addition to fewer defects and improved quality, a definite improvement in the efficiency of tube production has been effected.

While there have been shown and described what are at present considered the preferred embodiments of the invention, it will be obvious to those skilled in the art that various changes and modifications may be made therein without departing from the invention as defined by the appended claims.

We claim:

1. In the manufacture of a cathode ray tube, a process for speeding the aluminizing of the applied phosphor screen comprising the steps of:

rinsing said phosphor screen with an aqueous solution of an organic solvent wherein said solvent does not exceed ranges substantially from one percent to twenty percent of the total volumetric content of said solution, said water soluble organic solvent being at least one compound having a melting point below −11° C and a molecular weight substantially within the range of 32.0 to 89.0 selected from the group consisting essentially of methanol, ethanol, 1-propanol, 2-propanol, 2-methyl-1-propanol, 1-butanol, 2-butanol, 3-methyl-1-butanol, 2-methyl-2-butanol, 1-pentanol, 2-pentanol, 2-propanone, 2-butanone and 2-pentanone;

draining said aqueous solution from said screen to provide for the rapid formation of a screen-dampening film contiguously following the rough topography of said phosphor screen, thereby forming an improved and continuous topographic barrier film to prevent the penetration of lacquer material subsequently applied thereon;

applying a uniform volatile lacquer film to said rinsed phosphor screen in a manner to contiguously follow the topography thereof;

aluminizing the surface of said applied lacquer film to provide a uniform metallic coating following the topography of said screen; and removing said lacquer film by baking.

2. A process for aluminizing the applied phosphor screen of a cathode ray tube according to claim 1 wherein said rinsing is accomplished with an aqueous solution of an organic solvent wherein said solvent does not exceed ranges substantially from one percent to twenty percent of the total volumetric content of said solution, said water soluble organic solvent being at least one compound having a melting point below −85° C and a molecular weight substantially within the range of 58.0 to 75.0 selected from the group consisting essentially of 1-propanol, 2-propanol, 2-methyl-1-propanol, 1-butanol, 2-butanol, 2-propanone, and 2-butanone, said solution providing for the rapid formation of a screen-dampening barrier film contiguously following the rough topography of said phosphor screens.

3. A process for aluminizing the applied phosphor screen of a cathode ray tube according to claim 1 wherein said rinsing is accomplished with an aqueous solution of organic solvent material wherein said solvent material does not exceed ranges substantially from 1 percent to 20 percent of the total volumetric content of said aqueous solution, wherein a minimum of 90 percent of said volumetric organic solvent content is at least one solvent having a melting point below −85° C and a molecular weight substantially within the range of 32.0 to 75.0 selected from the group consisting essentially of methanol, ethanol, 1-propanol, 2-propanol, 2-methyl-1-propanol, 1-butanol, 2-butanol, 2-propanone and 2-butanone, and wherein a maximum of 10 percent of said volumetric organic solvent content is at least one solvent compound having a melting point below −11° C and a molecular weight within the range of 86.0 to 89.0 selected from the group consisting of 3-methyl-1-butanol, 2-methyl-2-butanol, 1-pentanol, 2-pentanol, and 2-pentanone, said solution providing the rapid formation of a screen-dampening barrier film contiguously following the rough topography of said phosphor screen.

* * * * *